(12) United States Patent
McDonald

(10) Patent No.: US 6,993,057 B2
(45) Date of Patent: Jan. 31, 2006

(54) COARSE SPECTROMETER WITH A GRATING

(75) Inventor: Mark McDonald, Milpitas, CA (US)

(73) Assignee: Intel Corporation, Santa Clara, CA (US)

( * ) Notice: Subject to any disclaimer, the term of this patent is extended or adjusted under 35 U.S.C. 154(b) by 253 days.

(21) Appl. No.: 10/338,996

(22) Filed: Jan. 9, 2003

(65) Prior Publication Data

US 2004/0100635 A1    May 27, 2004

Related U.S. Application Data

(63) Continuation-in-part of application No. 10/306,110, filed on Nov. 26, 2002, now abandoned.

(51) Int. Cl.
*H01S 3/10* (2006.01)
*H01S 3/08* (2006.01)

(52) U.S. Cl. .................... 372/96; 372/20; 372/92; 372/99

(58) Field of Classification Search .................. 372/20, 372/43, 96, 101, 102
See application file for complete search history.

(56) References Cited

U.S. PATENT DOCUMENTS 6,275,317 B1 *   8/2001   Doerr et al. ................. 398/201
6,795,459 B2 *   9/2004   Tsai ............................ 372/28

* cited by examiner

*Primary Examiner*—Minsun Oh Harvey
*Assistant Examiner*—Armando Rodriguez
(74) *Attorney, Agent, or Firm*—Blakely, Sokoloff, Taylor & Zafman LLP

(57) ABSTRACT

A quasi-monochromatic light beam carrier for a particular telecommunication channel is likely to experience drift because of age, temperature, or other factors, and may cause the centroid wavelength of the carrier to shift. Temperature adjustments by wavelength lockers to compensate for drift on one channel may affect the performance of other channels. Embodiments of the present invention couple a quasi-monochromatic light beam through a substrate-based grating, diffract the light beam from the edge of the substrate to free space, and detect the light beam from free space at a position detector to determine the centroid wavelength based on a position of the light beam incident on the detector. The diffracted light beam may be reflected within the substrate a number of times prior to exiting the substrate towards the detector.

7 Claims, 4 Drawing Sheets

COARSE SPECTROMETER WITH A GRATING

CROSS-REFERENCE TO RELATED APPLICATIONS

This application is a continuation-in-part of U.S. Ser. No. 10/306,110, was filed on Nov. 26, 2002 and is now abandoned.

BACKGROUND

1. Field

The present invention relates to photonic devices and more particularly to an apparatus and method for determining the centroid wavelength of a light beam.

2. Background

There is increasing demand for tunable lasers for fiber optic networks. Dense wavelength division multiplexing (DWDM) fiber optic systems encode separate data streams in a single optical fiber by assigning each data stream to a specific channel of wavelength or frequency. Present channel separations are 50 GHz (approximately 0.4 nm) such that, for example, the International Telecommunication Union (ITU) allocated C band from 192.1 THz to 196.1 THz can support 81 channels.

DWDM systems have been largely based on distributed feedback (DFB) lasers. While DFB lasers have typically operated at a single wavelength or channel, recent technological developments have enabled narrowly tunable DFB lasers to address a few adjacent channels and widely tunable lasers have been developed that permit addressing many channels, for example all 81 of the C band 50 GHz channels or more.

One difficulty in exploiting laser tunability is in guaranteeing wavelength accuracy. One aspect of wavelength accuracy is the degree to which the lasing wavelength corresponds to one of the pre-defined channels. For example, the aging of the laser device or changes in the environment can cause a laser to drift in frequency, resulting in sub-optimal performance in the fiber optic network. Components known as wavelength lockers have been employed to combat this wavelength drift. Wavelength lockers are typically based on a passing a portion of the beam under test through reference etalon, which provides a transmission that is periodic in wavelength, and detecting the transmitted power with a detector. The wavelength locker can provide information regarding the accuracy of the test beam wavelength with respect to a spectrally periodic array of transmission peaks, and this information can be used to maintain the laser wavelength despite time dependent drifts.

A wavelength locker of the sort noted above is degenerate in etalon mode number. That is, there is an array of possible wavelengths that can give rise to the same signal from the wavelength locker. This poses a substantial problem for tunable lasers. Typically, a set of operating parameters is determined during a factory tuning calibration, and these parameters correspond to operation at the pre-defined operating channels. Unfortunately, the same factors that lead to wavelength drift can cause a drift in the parameter set needed to realize the pre-defined operating channels. In this case, a user command to tune the laser to a different channel will result in an inaccurate wavelength. A servo system based on a periodic wavelength locker will be able to correct wavelength inaccuracy only within a certain spectral capture range. For example, if the drift in the parameter set results in tuning the laser incorrectly by more than a half a channel, a servo system based on a wavelength locker will typically cause the laser wavelength to be updated to lock to the nearest pre-defined channel in the periodic array defined by the wavelength locker. This channel will by definition then be different than the one intended by the user. This error in absolute channel number will not be detected by this wavelength locker based servo system, and will result incorrect routing of the data.

Another issue facing laser manufacturers is packaging of photonic devices, as users demand additional functionality be integrated within industry defined form factors.

BRIEF DESCRIPTION OF THE DRAWINGS

In the drawings, like reference numbers generally indicate identical, functionally similar, and/or structurally equivalent elements. The drawing in which an element first appears is indicated by the leftmost digit(s) in the reference number, in which.

DETAILED DESCRIPTION OF THE ILLUSTRATED EMBODIMENTS

Figure 1:
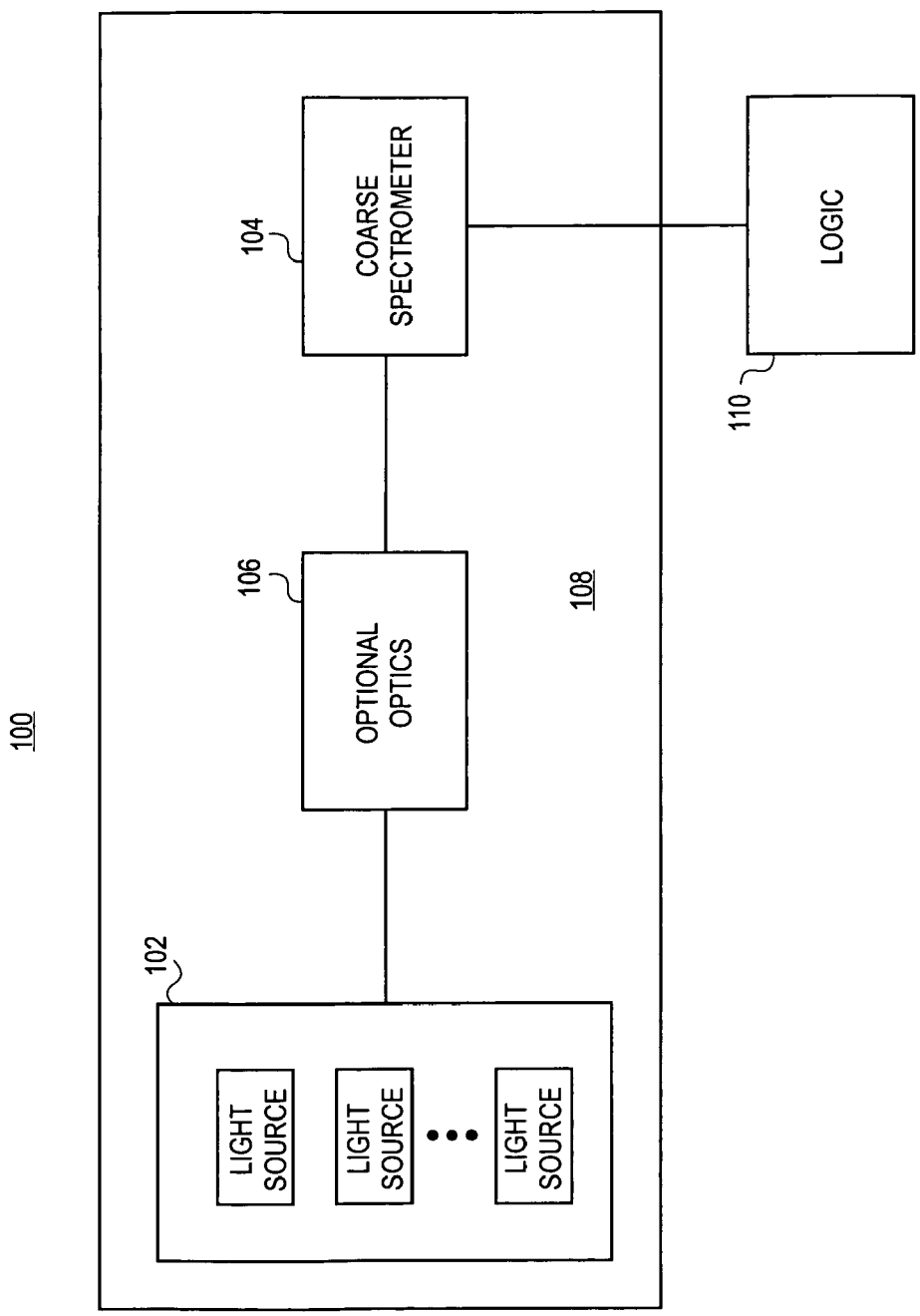
FIG. 1 is a high-level block diagram of a system for determining the centroid wavelength of a light beam according to an embodiment of the present invention.

Embodiments of the present invention are directed to determining the centroid wavelength of a quasi-monochromatic light beam, using a compact coarse spectrometer as the channel identifier, housed in the same package as the quasi-monochromatic light source. FIG. 1 is a high-level block diagram of a system 100 for determining the centroid wavelength of a light beam according to an embodiment of the present invention. The system 100 includes a light source 102, a coarse spectrometer 104, optional optics 106 coupled between the light source 102 and the coarse spectrometer 104, and a package 108, which houses the light source 102, coarse spectrometer 104, and optics 106. The system 100 also may include logic 110, which may be coupled to the coarse spectrometer 104 as illustrated or coupled external to a system external to the system 100. Although illustrated as external to the package 108, the logic 110 may be inside the package 108.

The light source 102 may be one or more light sources that emit quasi-monochromatic light beams, including sub-wavelengths peaked around centroid wavelengths Light sources suitable for implementing the light source 102 include tunable lasers, filtered broadband light from devices such as erbium-doped fiber amplifiers (EDFA), addressable DFB laser arrays, and the like.

In one embodiment, the coarse spectrometer 104 may determine the centroid wavelength of an incoming light beam, using principles of coarse spectrometry (e.g., spectral resolution to approximately one to 0.1 part per number of included channels, for example, one part per hundred to one part per thousand). The coarse spectrometer 104 is small enough to fit inside a standard photonic device package for the light source 102 (e.g., a laser package). Embodiments of the coarse spectrometer 104 are described in greater detail below with respect to FIG. 2 and FIG. 3 below.

The optics 106 may be one or more lenses or other optics, which may aid in focusing a light beam towards the coarse spectrometer 104. After reading the description herein, persons skilled in the art will readily recognize how to implement the optics 106 in one or more embodiments of the present invention.

The package 108 may be any packaging suitable for housing a light source, such as the light source 102, along with the coarse spectrometer 104. Suitable packaging may accommodate placing the coarse spectrometer 104 in proximity to the light source 102 along the length of the packaging. Alternative suitable packaging may accommodate placing the coarse spectrometer 104 in proximity to the light source 102 about the width of the packaging.

Logic 110 may be coupled to the course spectrometer 104, to perform signal processing, for example, on the output of the coarse spectrometer 104. Although not shown in FIG. 1, the logic 110 may be coupled back to the light source 102 to provide feedback to the light source 102. Alternatively, the logic 110 may be coupled to an external system (e.g., to provide an indication of whether the light source 102 is emitting the proper centroid wavelength). After reading the description herein, persons skilled in the art will readily recognize how to implement the logic 110 in one or more embodiments of the present invention.

Figure 2:
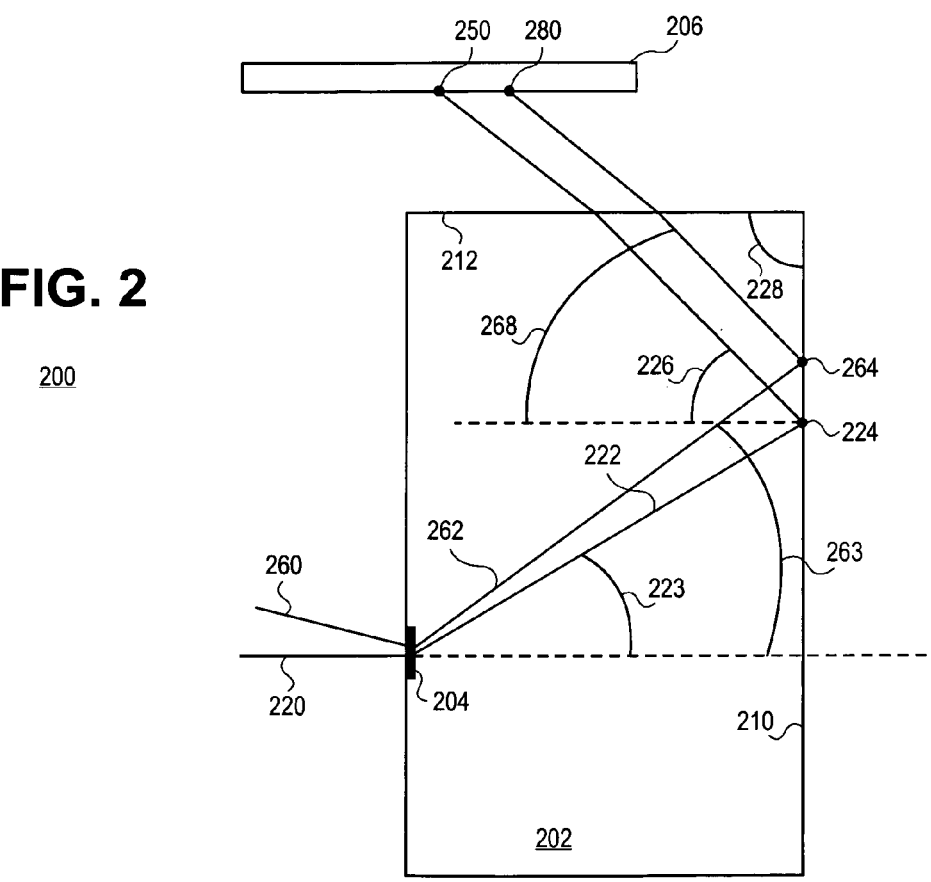
FIG. 2 is a schematic diagram of a coarse spectrometer according to an embodiment of the present invention.

FIG. 2 is a schematic diagram of a coarse spectrometer 200 according to an embodiment of the present invention. The coarse spectrometer 200 includes a substrate 202, a grating 204 formed in or on the substrate 202, and a detector 206. The substrate 202 includes an interface 210 and an interface 212.

The substrate 202 may be fabricated from any material with a suitable refractive index and/or suitable dispersion. For example, the substrate 202 may be fabricated from glass, which has a refractive index approximately equal to 1.5, fused silica, which has a refractive index approximately equal to 1.44, an infrared material, which has a refractive index approximately equal to 3.5, or other suitable material.

The grating 204 may be any source of periodic refractive index or surface height perturbations. For example, the grating 204 may be periodic perturbations formed as an integral part of the substrate 202 (e.g., etched). Alternatively, the grating 204 may be periodic refractive index perturbations on a discrete component adhered to the substrate 202.

In one embodiment, the grating 204 may be a large number of fine equidistant grooves such that a spectral centroid of a light beam incident thereupon will be diffracted into a particular angle. Light beams having different centroid wavelengths are diffracted at different angles. The angular dispersion of the wavelengths is, in general, nonlinear, but is in principle inversely proportional to the groove spacing. In an alternative embodiment, the grating 204 may be blazed so that the most of the energy of the light beam the diffracted into a single spectral order (e.g., $1^{st}$). The grating 204 may be a transmission grating or a reflection grating.

The detector 206 may be any suitable detector that is sensitive to the spatial position of the incident light. Diffraction and subsequent propagation cause different wavelengths to intersect the detector at different spatial positions. Hence, the spatial position information provided by the detector reveals the incident wavelength to a level needed to uniquely identify the proximate channel number. The detector 206 and associated electronics may be designed such that the signal difference in spatial position corresponding to the wavelength difference is adequately resolved with respect to electronic niose. In one embodiment, the detector 206 may be any well known "split detector" or a "bi-cell." Alternatively, the detector may be any well-known linear position detector.

The interface 210 may include any well-known reflector, which may be formed in or on the inner surface of the substrate. Suitable reflectors include aluminum or other metallic coating, or dielectric thin film coatings. Alternatively, the interface 210 may have a refractive index that is greater than the refractive index of the medium adjacent to the interface 210 in the package 108 (e.g., air). This index difference can be used as a perfect reflector for angles of incidence greater than that needed for total internal reflection (TIR). Higher index substrate materials permit a wider range of diffraction angles that meet the TIR condition. It is also possible to rely upon partial reflection due to the index mismatch (as determined by Fresnel's law), although this causes a loss of energy that can significantly impact the signal to noise ratio of the light as detected on the detector.

The interface 212 may be the edge of the substrate 202.

To illustrate the operation of one embodiment of the coarse spectrometer 200, assume that a light beam 220 is incident on the grating 204. The grating 204 diffracts a centroid wavelength 222 at an angle 223. The centroid wavelength 222 is incident on the interface 210 at a point 224. The grating 204 and the centroid wavelength 222 determine the angle 223 and the point 224. After reading the description herein, persons skilled in the art will readily recognize how to implement the angle 223 in one or more embodiments of the present invention. Likewise, after reading the description herein, persons skilled in the art will readily recognize how to implement the centroid wavelength 222 in one or more embodiments of the present invention.

The interface 210 reflects the centroid wavelength 220 to the interface 212 at an angle 226. The critical angle of the substrate 202 and an angle 228 determine the angle 226. The critical angle of the substrate 202 depends on the material of the substrate 202. After reading the description herein a skilled artisan will be able to implement embodiments of the present invention for a variety of substrate materials.

The centroid wavelength 222 is incident on the interface 212. Most of the light beam 222 may be coupled off the substrate 202 at the interface 212. If there is some light reflected at the interface 212 in accordance with Fresnel's law, the coupling efficiency may be reduced. There are several ways to enhance coupling of light out of the substrate 202. In one embodiment, anti-reflective coating may be added to all or part of the inner surface of the interface 212. In an alternative embodiment, if the polarization of the light beam 222 is known (e.g., horizontal (p) polarization), and the light beam 222 intercepts the interface 212 at an angle equal to Brewster's angle for the particular substrate 202 material, then approximately one hundred percent of the light beam 222 may exit the substrate 202 via the interface 212. Because the angle 226 as illustrated is less than the critical angle of the substrate 202, the centroid wavelength 222 exits the substrate 202 at the interface 212.

The centroid wavelength 222 exiting the substrate 202 passes through free space and is incident on the detector 206 at a position 250.

In an alternative embodiment in which the detector 206 may be a linear position detector, a light beam 260 (e.g., a different channel) is incident on the grating 204. The grating 204 diffracts a centroid wavelength 262 at an angle 263. The centroid wavelength 262 is incident on the interface 210 at a point 264. The centroid wavelength 262 is incident on the interface 212, may be reflected at an angle of 268, and exits the substrate 202 at the interface 212, and is incident on the detector 206 at a position 280. The detector 206 determines the centroid wavelength 262 based on the centroid wavelength being incident at the position 280.

Although illustrated as such, it is not necessary that the angle 228 be a right angle (ninety degrees). Angles may be selected to ensure that a usable amount of light exits the substrate 202 for detection by the detector 206. If the angle 228 is such that the angle of incidence for the diffracted wavelength exceeds the critical angle then total internal reflection occurs and no light exits the substrate 202 at the interface 210. The refraction at this interface is also generally wavelength dependent and can be used to increase the wavelength sensitivity of the coarse spectrometer 200 overall. The choice of the angle 228 and the length of the substrate 202 optical path determine the number of times the light is reflected in substrate 202.

Figure 3:
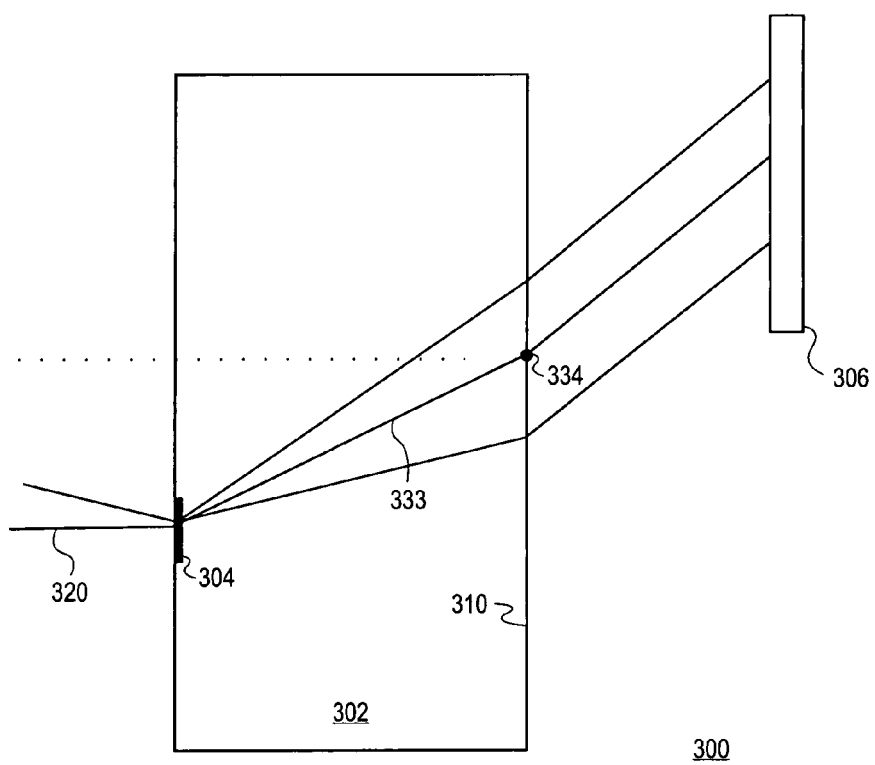
FIG. 3 is a schematic diagram of a coarse spectrometer according to an alternative embodiment of the present invention.

FIG. 3 is a schematic diagram of a coarse spectrometer 300 according to an alternative embodiment of the present invention. The coarse spectrometer 300 includes a substrate 302, a grating 304 formed in or on the substrate 302, and a detector 306. The substrate 302 includes an interface 310.

To illustrate the operation of the coarse spectrometer 300 according to one embodiment, assume that a light beam 320 is incident on the grating 304. The grating 304 diffracts a centroid wavelength 333 the centroid wavelength 333 is incident on the interface 310 at a point 334 and exits the substrate 303 at the interface 313. The detector 306 detects the light to determine the centroid wavelength in a manner similar to the detector 306.

Figure 4:
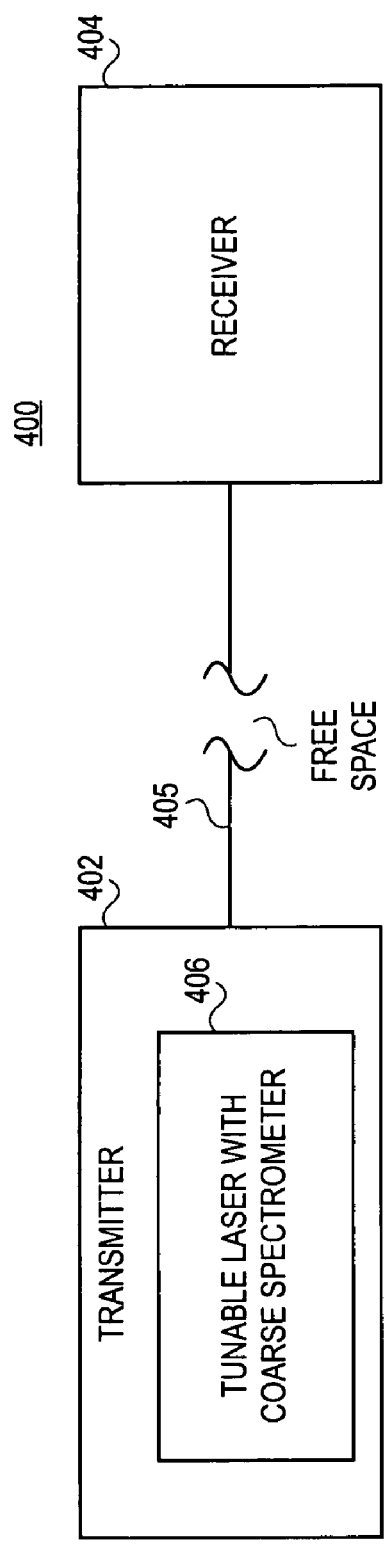
FIG. 4 is a high-level block diagram of a telecommunication system according to an embodiment of the present invention.

FIG. 4 is a high-level block diagram of a telecommunication system 400 according to an embodiment of the present invention. The system 400 includes a transmitter 402 and a receiver 404. The transmitter 402 may launch a light beam into an optical fiber 405 and/or free space. The receiver 404 may receive a light beam from free space and/or the optical fiber 405. The transmitter 402 includes a tunable laser with coarse spectrometer 406. The tunable laser with coarse spectrometer 406 may include the coarse spectrometer 200 and/or 300 or other coarse spectrometer implemented as an embodiment of the present invention.

In the description, numerous specific details, such as particular processes, materials, devices, and so forth, are presented to provide a thorough understanding of embodiments of the invention. One skilled in the relevant art will recognize, however, that the embodiments of the present invention can be practiced without one or more of the specific details, or with other methods, components, etc. In other instances, well-known structures or operations are not shown or described in detail to avoid obscuring the understanding of this description.

Some parts of this description are presented using terms such as grating, wavelength, reflector, frequency, and so forth. These terms are commonly employed by those skilled in the art to convey the substance of their work to others skilled in the art.

Various operations will be described as multiple discrete blocks performed in turn in a manner that is most helpful in understanding embodiments of the invention. However, the order in which they are described should not be construed to imply that these operations are necessarily order dependent or that the operations be performed in the order in which the blocks are presented.

Reference throughout this specification to "one embodiment" or "an embodiment" means that a particular feature, structure, process, block, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

While specific examples and/or embodiments of the invention are described herein for illustrative purposes, various equivalent modifications are possible, as those skilled in the relevant art will recognize. These modifications can be made in light of the above detailed description.

Embodiments of the invention can be implemented using hardware, software, or a combination of hardware and software. In implementations using software, the software may be stored on a computer program product (such as an optical disk, a magnetic disk, a floppy disk, etc.) or a program storage device (such as an optical disk drive, a magnetic disk drive, a floppy disk drive, etc.).

The above description of illustrated embodiments of the invention is not intended to be exhaustive or to limit embodiments of the invention to the precise forms disclosed. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An apparatus, comprising:
   an addressable distributed feedback (DFB) laser and a substrate in a photonic device package, the addressable DFB laser to emit a quasi-monochromatic light beam having a centroid wavelength;
   refractive index perturbations disposed in or on the substrate to direct the light beam to a first edge of the substrate, the first edge of the substrate to reflect the light beam to a second edge of the substrate, the second edge of the substrate to diffract the light beam to free space; and
   a detector in the package and operatively coupled to receive the light beam from free space to determine the centroid wavelength of the light beam based on a position of the light beam incident on the detector.

2. The apparatus of claim 1, wherein the addressable DFB laser is widely tunable.

3. The apparatus of claim 1, wherein the addressable DFB laser is to emit a second quasi-monochromatic light beam having a second centroid, the detector to receive the second light beam from free space to determine the second centroid wavelength of the second light beam based on a second position of the light beam incident on the detector.

4. The apparatus of claim 1, wherein the refractive index perturbations disposed in or on the substrate form a transmission grating or a reflection grating.

5. A system, comprising:

a transmitter;

a coarse spectrometer having an addressable distributed feedback (DFB) laser and a substrate in a photonic device package, the addressable DFB laser to emit a quasi-monochromatic light beam having a centroid wavelength, refractive index perturbations disposed in or on the substrate to direct the light beam to a first edge of the substrate, the first edge of the substrate to reflect the light beam to a second edge of the substrate, the second edge of the substrate to diffract the light beam to free space, and a detector in the package and operatively coupled to receive the light beam from free space to determine the centroid wavelength of the light beam based on a position of the light beam incident on the detector; and a receiver coupled to receive the light beam from the optical fiber or free space.

6. The system of claim 5, wherein the refractive index perturbations disposed in or on the substrate form a transmission grating or a reflection grating.

7. The system of claim 5, wherein the coarse spectrometer is widely tunable.

* * * * *